United States Patent Office
2,843,600
Patented July 15, 1958

2,843,600

PREPARATION OF PYRROLIDINONE

Charles H. McKeever, Meadowbrook, Pa., assignor to Rohm & Haas Company, Philadelphia, Pa., a corporation of Delaware No Drawing. Application June 29, 1956
Serial No. 594,708

4 Claims. (Cl. 260—326.5)

This invention deals with a process for preparing pyrrolidinone. According to this process, a high yield is obtained in converting an alkyl beta-cyanopropionate to pyrrolidinone by mixing a nickel hydrogenation catalyst with an inert organic liquid, supplying hydrogen under pressure to the mixture, heating it between 150° C. and about 260° C., and, while the heated mixture under hydrogen is agitated, adding thereto a lower alkyl beta-cyanopropionate. The reaction mixture is maintained during the conversion of cyanopropionate to pyrrolidinone at a temperature between 150° C. and about 300° C., preferably 160° C. to 240° C., and under a total pressure of 200 to 5,000 pounds or more.

It is known that ethyl beta-cyanopropionate can be converted to pyrrolidinone by hydrogenation. Adkins et al. obtained a yield of 38% at the conventional temperatures of 70° C.–90° C. under hydrogen at 50–200 atmospheres pressure on Raney nickel. The art teaches that it is desirable to carry out this reaction and others comparable to it at the lowest temperature consistent with reasonable speed in order to avoid side reactions.

There is overwhelming evidence that side reactions, including hydrogenolysis, and also catalyst deactivation are largely avoided when hydrogenations are carried out under the mildest conditions possible. It is certainly true here that, if an alkyl beta-cyanopropionate, catalyst, and hydrogen are heated to temperatures of 150° C. or more, by-product formation is enhanced and catalyst is deactivated. Hence, it would appear that excessive temperatures ought to be avoided here as in all cases except where hydrogenolysis or pyrolytic decomposition is the desired reaction. If a mixture of catalyst and an alkyl beta-cyanopropionate is heated to relatively high temperatures and hydrogen is slowly added, the catalyst becomes inactivated.

It was, therefore, surprising to find that high yields of pyrrolidinone can be obtained at temperatures from 150° C. to 300° C. by gradually adding an alkyl beta-cyanopropionate to a pressure vessel in which catalyst and inert solvent are being agitated, into which hydrogen under pressure has been admitted, and which is heated to this temperature range. Under these conditions hydrogenation and cyclization occur with great rapidity. Apparently, if pyrrolidinone is once formed, it is stable under these conditions. The side reactions which occur under conventional conditions are apparently for the most part avoided. Catalyst remains active and can be repeatedly used.

As inert solvent, there may be used pyrrolidinone itself or a reaction mixture containing pyrrolidinone from a previous preparation, or such a solvent as an alkanol, particularly a lower alkanol, or an ether such as butyl ether. The primary function of the solvent is to provide a stirrable mixture with the catalyst. Only enough liquid need be used in the mixture of solvent and catalyst at the start of a preparation to provide good agitation. As reaction proceeds, the pyrrolidinone formed provides more liquid.

The catalyst used is a nickel catalyst for hydrogenation, such as Raney nickel or reduced nickel deposited on silica or diatomaceous earth. The proportion of catalyst to the total amount of alkyl beta-cyanopropionate reacted may vary from about a tenth percent of this reactant up to about ten percent or more. At lower temperatures and pressures it is generally desirable to employ a relatively greater proportion of catalyst to total reactant than at higher temperatures, if high yields are to be obtained. Thus, at 160° C. and 250 p. s. i. best results were obtained with above 5% of catalyst, while at 220° C. and 800 p. s. i. about 0.5% was sufficient for maximum yields. Since the desired reaction approaches being instantaneous, the actual ratio of catalyst to alkyl beta-cyanopropionate is very large at any given moment.

The process of this invention may be carried out by charging a pressure vessel with catalyst and solvent. The vessel is flushed with an inert gas or with hydrogen and hydrogen is pressed in to a pressure of 30 to 300 p. s. i. and is further supplied as needed to maintain such a partial pressure of hydrogen. Total pressures will, of course, be higher than this. The mixture in the vessel is heated to at least 140° C. and the contents stirred or otherwise well agitated. The alkyl beta-cyanopropionate is then pumped into the vessel, the rate of addition being controlled to maintain the temperature of the reacting mixture between 150° C. and about 300° C., there being taken into consideration the cooling capacity of the reaction vessel. There is considerable heat of reaction to be dissipated, as through a cooling coil, since about 40,000 kcal./g. mole evolved. Very shortly after the feed of alkyl beta-cyanopropionate is discontinued (within less than 60 seconds), the reaction temperature drops. The reaction mixture may then be cooled, the vessel vented, and the product filtered and distilled. Yields of 90% to 95% are readily possible. If desired, gas may be vented from the reaction vessel to carry out of it some of the alkanol formed in the reaction. In this way the partial pressure of the hydrogen can be adequately maintained and one of the products of reaction removed.

A small increase in yield is possible by including in the reaction mixture a small proportion of ammonia. Since yields are already high when the conditions discussed are met, it is, of course, difficult to obtain any marked improvement in yield by use of ammonia. Yet yields of 96% to 98% can be obtained by following the above procedure and including 0.1 to 0.5 mole or more of ammonia per mole of alkyl beta-cyanopropionate.

In the isolation of the pyrrolidinone the reaction mixture is freed of catalyst, conveniently by filtration. Alkanol is removed by heating the mixture. The stripped product may then be fractionally distilled. Because of the high boiling point of pyrrolidinone, distillation under reduced pressure is preferable though not essential.

The process as described may be performed batchwise or by obvious modifications can be made continuous. Thus, there may be pumped into a pressure reaction vessel an alkyl beta-cyanopropionate, catalyst, solvent, if desired, and hydrogen. Reaction mixture is taken over in a high pressure receiver from which gas is vented and liquid drawn off for working up. The gas can be recirculated, best after alkanol is condensed therefrom. Yields of about 94% have readily been obtained in this manner.

If it is desired to use ammonia, it may be pressed into the reaction vessel, or it may be dissolved in the mixture of alkyl beta-cyanopropionate and solvent to be pumped into this vessel.

Examples follow which are given by way of illustration and not by way of limitation. Parts therein are by weight unless otherwise designated.

*Example 1*

An autoclave is prepared equipped with an efficient agitator which can be operated at 600 R. P. M., a cooling coil, an electrical heating system, and inlet tubes. Hydrogen is supplied to the vessel through a tube terminating below the agitator. Starting materials are pumped into the system.

The autoclave is charged with 250 parts of methanol and 30 parts of a finely divided nickel catalyst consisting of 50% reduced nickel on kieselguhr. The vessel is closed, flushed with hydrogen, pressured with hydrogen to 200 p. s. i., and heated to 155° C. The hydrogen pressure is increased to 500 p. s. i. Through the liquid line into the vessel, initially filled with methanol, there is now pumped methyl beta-cyanopropionate. This inlet line is equipped with a preheater so that the initial flow of this ester can be heated to 140° C. to 160° C. In this example the initial inlet temperature is 155° C. After about 10 parts of this ester has been introduced, a rise in temperature is noted. Water is now passed through the cooling coil at a rate to maintain the reaction mixture at about 170° C. with the ester being pumped in at about nine parts per minute. Hydrogen is supplied through a reducing valve set at about 500 p. s. i. Pumping is continued until 565 parts of methyl beta-cyanopropionate have been introduced. The feed line is then flushed with methanol. There is a noticeable drop in temperature of the reaction mixture as soon as addition of ester is stopped.

The supply of hydrogen is shut off and the reaction mixture is cooled. The vessel is vented. The reaction mixture is filtered and vessel and filter are rinsed with methanol. The filtrate is a light yellow liquid. It is heated under reduced pressure on a steam bath and methanol is distilled off and collected, a final temperature of 95° C. at 30 mm. being used. The crude pyrrolidinone amounts to 420 parts. This is purified by distilling at reduced pressure. At the start a high reflux ratio is used. The boiling point of pyrrolidinone is quickly reached and pure product is taken off at a low reflux ratio. Distillation is continued until the pot temperature is 40° C.–50° C. above the boiling point of pyrrolidinone. A yield of about 400 parts is readily obtained. Residue is about 15 parts. The product is at least 98.5% pure pyrrolidinone. The boiling point is 122° C. at 10 mm. pressure. The refractive index at 25° C. is 1.4860. Infrared analysis indicates a trace of butyrolactone and no methyl cyanopropionate.

The above procedure applied to ethyl beta-cyanopropionate gives pyrrolidinone in a 92% yield. A preparation starting with butyl beta-cyanopropionate gives the same yield of pyrrolidinone.

The above procedure is followed except that reaction temperatures are held at 220° C. to 240° C. The product is of excellent purity and is obtained in similar yields. The higher temperature requires less cooling area or permits more rapid input for the same cooling area. Furthermore, the residue on distillation is noticeably reduced.

*Example 2*

The same apparatus is used as in Example 1 and conditions and proportions are kept nearly the same, except that there is run into the initial charge 15 parts of ammonia. The stripped, crude pyrrolidinone amounts to 423 parts and the yield of distilled, practically pure pyrrolidinone is 95% with a residue of 10 parts.

Repetition of this procedure has carried yields to at least 97% of practically pure product.

*Example 3*

The procedure of Example 2 is repeated with catalyst from this previous preparation. There is obtained an almost identical yield of practically pure pyrrolidinone.

*Example 4*

The previously described apparatus is modified by including a dip tube through which reaction mixture can be taken off. The lower end of the dip tube carries a micro-metallic filter. Through this filter and tube solution and gas can be taken off and passed to a high pressure receiver. A cooling coil is applied to the tube between autoclave and receiver. The receiver contains valves for bleeding off gas from the top of the receiver and liquid from the bottom.

The autoclave is charged with 160 parts of methanol and 45 parts of a hydrogenation catalyst consisting of reduced nickel (50%) carried on kieselguhr (50%). The autoclave is closed, flushed with hydrogen, pressured at 400 p. s. i. with hydrogen and heated to 170° C. Heating is discontinued and the hydrogen pressure increased to 800 p. s. i. with the source of hydrogen connected through a constant pressure regulator set at 800 p. s. i.

A feed reservoir is charged with a solution containing methyl beta-cyanopropionate, methanol, and ammonia in a weight ratio of 20:5:1. This solution is pumped into the heated reaction vessel. Just as soon as the solution comes in contact with the stirred suspension of catalyst, a rise in temperature is noted. The temperature is permitted to rise to about 180° C., at which point water is pumped into the cooling coil at a rate to help maintain the temperature at about this level at the rate of feed of solution of about 12 parts per minute. Hydrogen is bled from the receiving vessel and in about five minutes reaction mixture begins to pass to the pressure receiver, from which it is taken off. The liquid is filtered through a filter aid to remove very fine particles of catalyst, stripped of methanol, and distilled, essentially as described above. The product is identical with that made in previous examples. Yield of purified product is about 95% of theory.

This procedure is repeated with a feed of methyl beta-cyanopropionate, methanol, and ammonia in a weight ratio of 20:2:1. Results are essentially the same as in the above preparation. The methanol in the feed is used only as a matter of convenience to permit solution of ammonia which is not particularly soluble in the ester by itself unless pressure is used.

Repetition of the above procedure without use of ammonia or methanol in the feed readily gives yields of 88% to 90%.

It has thus been demonstrated that by carrying out the hydrogenation and cyclization of lower alkyl beta-cyanopropionates at temperatures higher than would be indicated by the art there results very rapid reaction to the desired pyrrolidinone in high yields. In order to utilize these high temperatures, it is necessary to bring an alkyl beta-cyanopropionate into contact with a hydrogenation catalyst and hydrogen under controlled conditions, particularly as to rate of addition and as to control of temperature. The reaction then proceeds efficiently and smoothly and can be performed batchwise or continuously.

I claim:

1. A process for preparing pyrrolidinone which comprises passing a lower alkyl beta-cyanopropionate into an agitated slurry of a nickel hydrogenation catalyst in an inert organic solvent under hydrogen under pressure at a temperature of about 150° C. to 300° C.

2. A process for preparing pyrrolidinone which comprises mixing a nickel hydrogenation catalyst and an inert organic solvent, supplying hydrogen under pressure to the resulting mixture, agitating and heating the mixture under hydrogen to 150° C. to 260° C., bringing a lower alkyl beta-cyanopropionate into the agitated heated mixture, and holding the temperature of the reaction mixture between 150° C. and 300° C. while the alkyl beta-cyanopropionate is being added thereto.

3. The process of claim 2 in which the alkyl beta-cyanopropionate is methyl beta-cyanopropionate.

4. The process of claim 2 in which the alkyl beta-cyanopropionate is ethyl beta-cyanopropionate.

References Cited in the file of this patent
FOREIGN PATENTS
898,359    France _____ July 3, 1944